(12) United States Patent
Igarashi

(10) Patent No.: US 6,788,344 B2
(45) Date of Patent: Sep. 7, 2004

(54) EXCHANGEABLE CONNECTING DEVICE BETWEEN VIDEO CAMERA AND AUTOMATIC IRIS LENS

(75) Inventor: Shigehisa Igarashi, Tsuruoka (JP)

(73) Assignee: Watec Co., Ltd., Tsuruoka (JP)

( * ) Notice: Subject to any disclaimer, the term of this patent is extended or adjusted under 35 U.S.C. 154(b) by 278 days.

(21) Appl. No.: 09/778,631

(22) Filed: Feb. 7, 2001

(65) Prior Publication Data

US 2002/0015099 A1 Feb. 7, 2002

(30) Foreign Application Priority Data

May 8, 2000 (JP) ........................................ 2000-134933

(51) Int. Cl.⁷ .............................................. H04N 5/238
(52) U.S. Cl. ...................................... 348/363; 396/217
(58) Field of Search ................................. 348/362, 363, 348/364, 360, 361, 335, 375; 396/65, 213, 214, 215, 529, 530, 71, 257, 217

(56) References Cited

U.S. PATENT DOCUMENTS

| | | | |
|---|---|---|---|
| 4,518,239 A | * | 5/1985 | Tomori ........................ 396/71 |
| 4,551,764 A | | 11/1985 | Ogawa |
| 4,567,509 A | | 1/1986 | Takayama et al. |
| 4,605,955 A | | 8/1986 | Hashimoto et al. |
| 4,845,555 A | | 7/1989 | Yabe et al. |
| 4,860,113 A | | 8/1989 | Miyamoto et al. |
| 4,959,728 A | | 9/1990 | Takahashi et al. |
| 5,068,680 A | | 11/1991 | Kawasaki et al. |
| 5,087,978 A | | 2/1992 | Hieda |
| 5,731,920 A | | 3/1998 | Katsuragawa |
| 5,877,811 A | | 3/1999 | Iijima et al. |
| 6,064,432 A | * | 5/2000 | Sato ........................... 348/363 |
| 6,172,709 B1 | | 1/2001 | Yamano |
| 6,275,262 B1 | | 8/2001 | Ito |
| 6,392,702 B1 | * | 5/2002 | Arai et al. ................... 348/335 |
| 6,407,774 B1 | * | 6/2002 | Mabuchi et al. ............. 348/335 |

* cited by examiner

*Primary Examiner*—Tuan Ho
(74) *Attorney, Agent, or Firm*—David O'Reilly (57) ABSTRACT

An exchangeable connecting device between a video camera and an automatic iris lens in which one common connector (k) makes it possible to connect different kinds of lenses, and use any kind of a lens, $L_1$ or $L_2$ without first confirming the kind of lens to be used. In the video camera ($M_5$) one of video control signals (1), amplified by the output of a light sensor is directly connected to an analogue switch (t), while the other is connected through a galvanometer control circuit (p) to the analogue switch (t) by common connector (k). When a video signal control type automatic iris lens ($L_1$) is connected, a video control signal (1) amplified by the output of light sensor is directly connected to the analogue switch (t) and the common connector (k). When a DC control type automatic iris lens ($L_2$) is connected, analogue switch (t) selects a video control signal (1) amplified by the galvanometer control circuit p.

8 Claims, 8 Drawing Sheets

EXCHANGEABLE CONNECTING DEVICE BETWEEN VIDEO CAMERA AND AUTOMATIC IRIS LENS

BACKGROUND OF THE INVENTION

1. Field of the Invention

This invention relates to an exchangeable connecting device between a video camera and an automatic iris lens, especially an exchangeable connecting device arbitrary between video camera M and an automatic iris lens L having galvanometer control circuit p or an automatic iris lens L not having galvanometer control circuit p.

2. Description of the Prior Art

Figure 4:
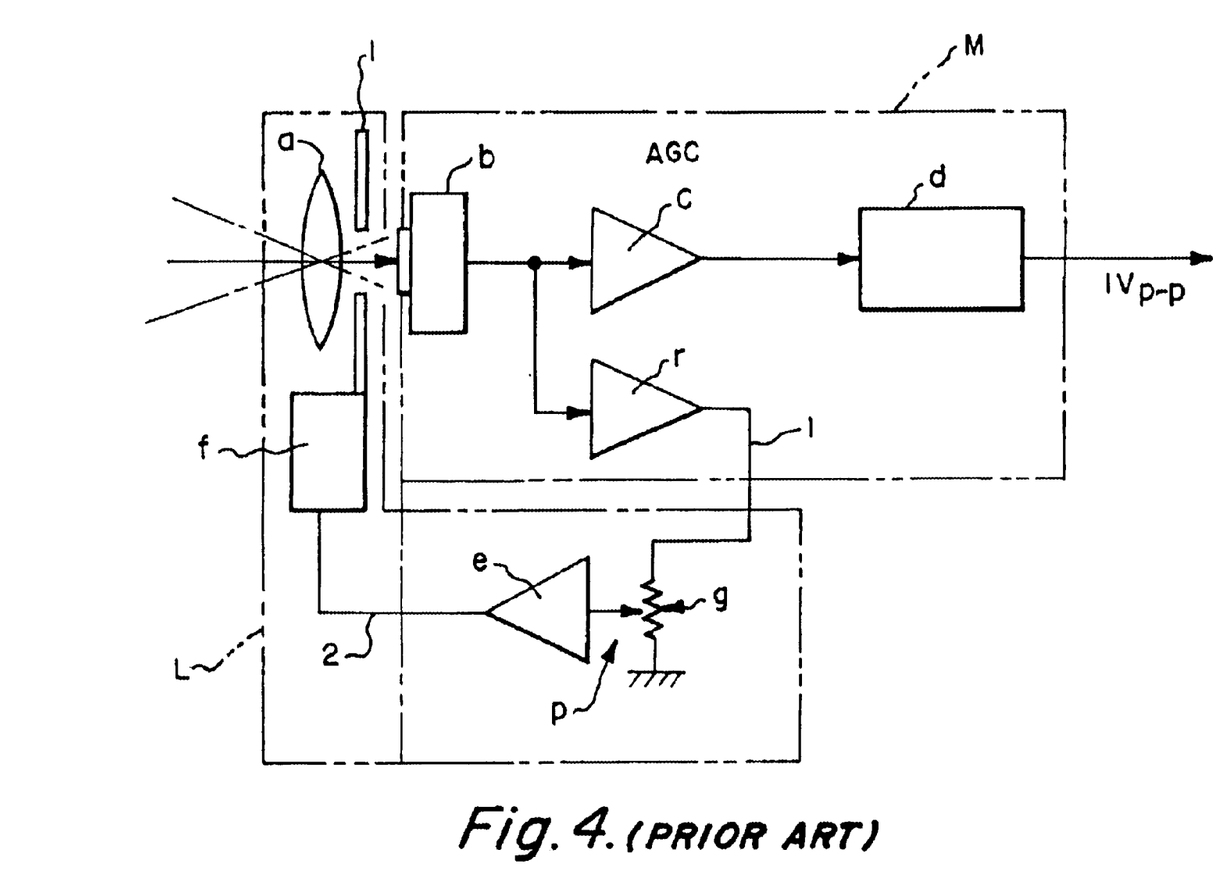
FIG. 4 shows a conventional circuit connecting device between video camera M and automatic iris lens $L_1$.

FIG. 4 shows a conventional connecting device between video camera M such as a CCD (Charged Couple Device) camera, an area image sensor and automatic iris lens L. Referring FIG. 4, an example of operational principal of automatic iris lens L and video camera M is explained.

A light signal passing through lens a is changed into electrical signal by area sensor b, amplified by AGC amplifier circuit c, processed by signal processing circuit d, and output as regular video signal IVpp.

On the other hand, a part of electrical signal of area sensor b is amplified by constant amplifier r of 6 dB to 12 dB and output as light control signal 1 for automatic iris lens L. Light control signal 1 is integrally amplified by level setting circuit e and provides driving DC current 2, for galvanometer f of iris control mechanism of automatic iris lens L. Variable resistor g is to set the iris value to a suitable value. Namely, DC current 2 increases according to an increase in light control signal 1 and closes iris I. On the contrary DC current 2 decreases according to a decrease in light control signal 1 and opens iris I, so that video camera M operates according to a suitable light control signal 1.

Normally, camera M needs various lens, therefore camera M and the lens are independent and according to necessity, connected by a thread.

On the other hand, information such as said light control signal 1 or driving DC current 2 are connected by a cable and connector.

However, there are two type of automatic iris lens L as follows;

1. VS (Video Signal) control type automatic iris lens $L_1$.

This VS control type automatic iris lens $L_1$ includes galvanometer control circuit p in which iris I is control by a part of light control signal 1 of a video signal.

Figure 5:
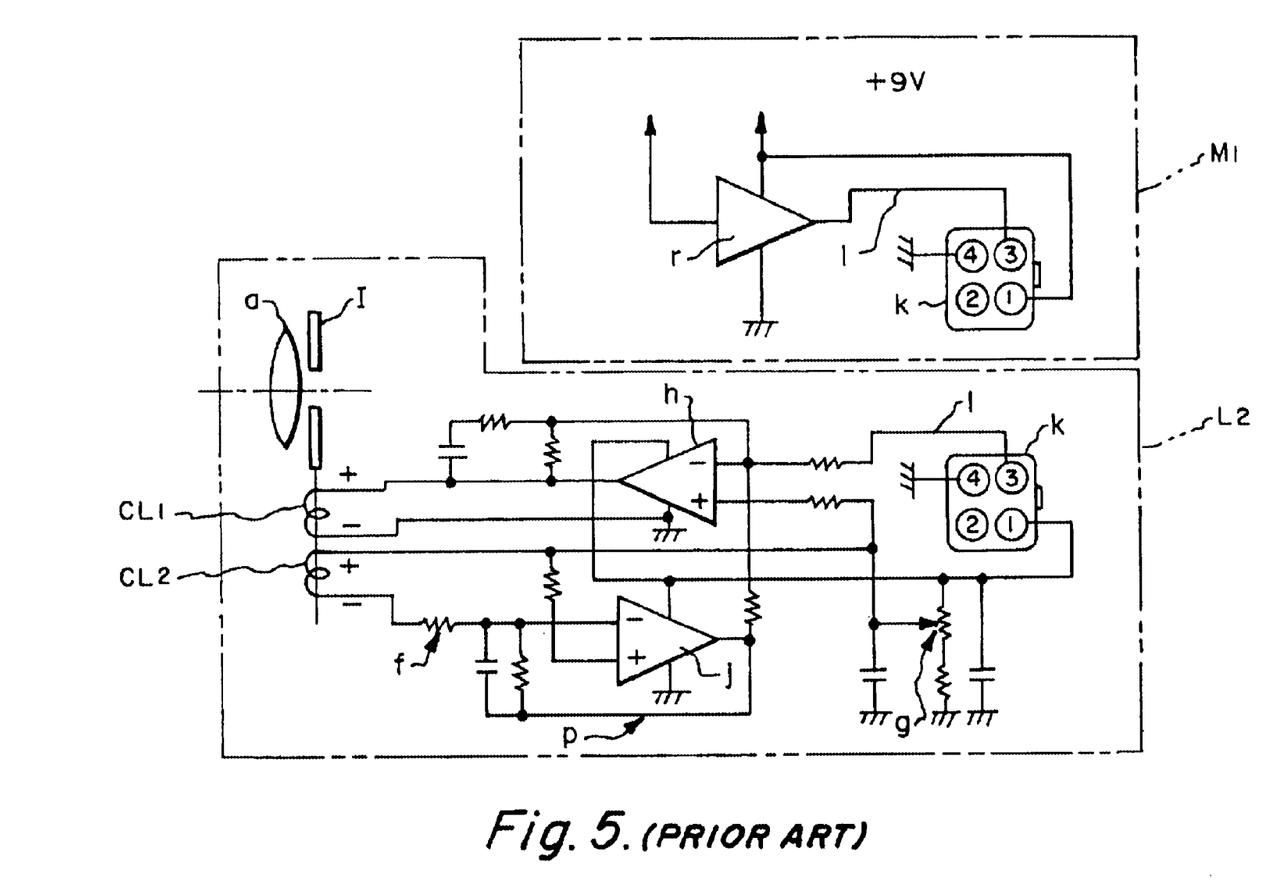
FIG. 5 shows a connecting device circuit of a conventional video camera $M_1$ and VS control type automatic iris lens $L_1$ having galvanometer control circuit p.

FIG. 5 shows a connecting device of conventional video camera $M_1$ and VS control type automatic iris lens $L_1$ having galvanometer control circuit p and the same or similar numerals used for the same or similar parts of FIG. 4 and so on.

Video camera $M_1$ and VS control type automatic iris lens $L_1$ have connectors k, k connected by a cable (not shown) respectively connecting terminals ①, ②, ③, ④ of connectors k, k. Terminal ① is connected to an electric circuit, terminals ②, ② are NC terminals (no connection), terminals ③, ③ are connected to light control signal 1, terminals ④, ④ are connected to ground (earth).

Operation of this circuit is as follows; light control signal 1 input from terminals ③ is integral amplified by driving amplifier h, and video control signal 1 of video camera $M_1$ set by variable resistor g reaches a level voltage corresponding to regular video signal IVpp, current in driving coil $CL_1$ of galvanometer f decreases and controls iris I. Braking coil $CL_2$ is to suppress rapid operation of driving coil $CL_1$. Braking coil $CL_2$ detects reverse voltage generated in galvanometer f, this reverse voltage is amplified in amplifier j, feedback to driving amplifier h, controls the movement of galvanometer f so as to be smooth and stable operation.

2. DC control type automatic iris lens $L_2$.

This DC control type automatic iris lens $L_2$ (FIG. 6) is intended to lower the lens price, which only includes galvanometer f and does not include galvanometer control circuit p (FIG. 5) and is driven by a suitable DC electric source from video camera $M_2$.

Figure 6:
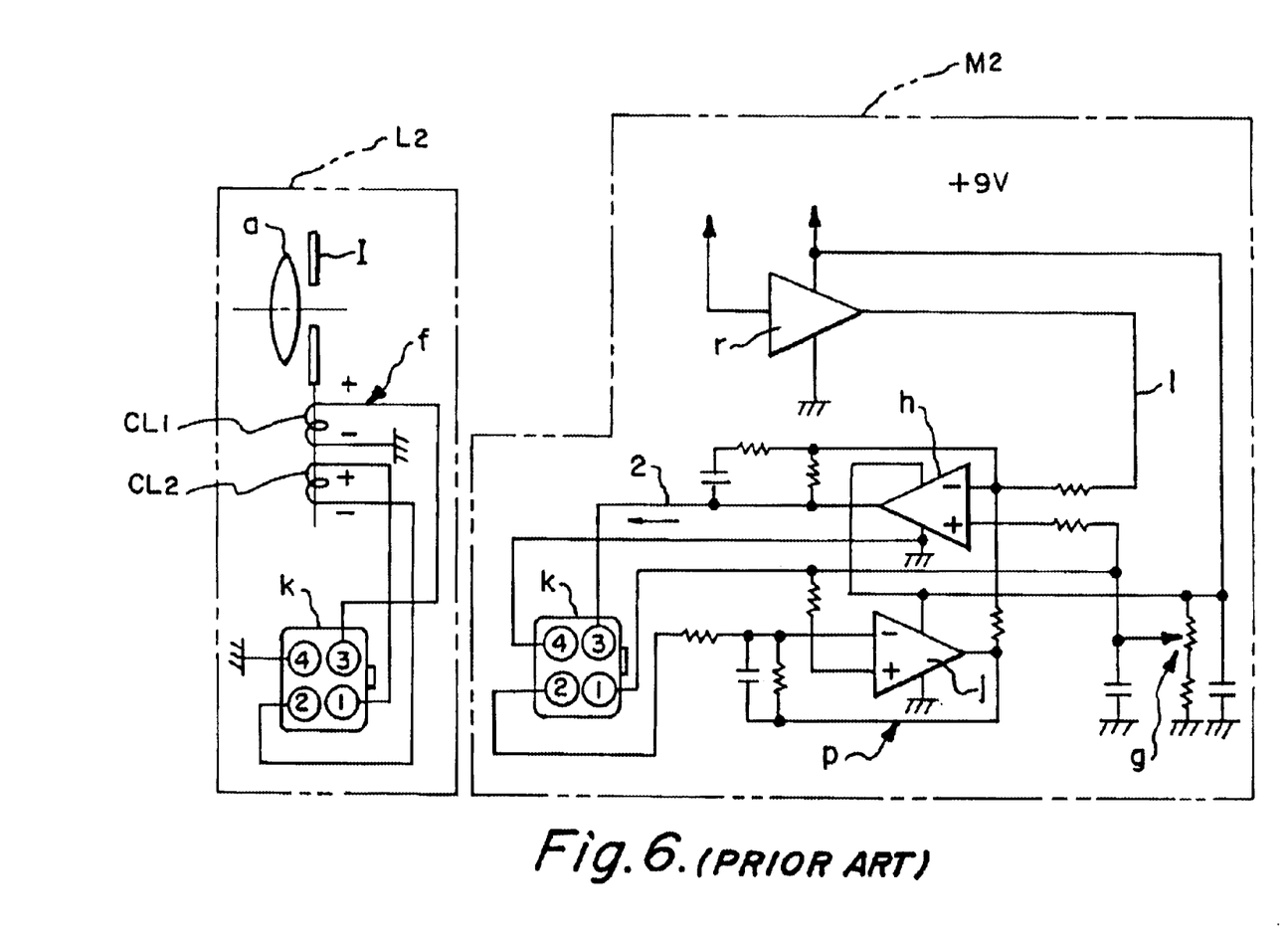
FIG. 6 shows a connecting device for a conventional video camera $M_2$ and DC control type automatic iris lens $L_2$, without galvanometer control circuit p.

FIG. 6 shows a connecting device of a conventional video camera $M_2$ and DC control type automatic iris lens $L_2$, without galvanometer control circuit p. As shown in FIG. 6, video camera $M_2$ and DC control type automatic iris lens $L_2$ have terminals of connectors k, k connected by a four wire cable (not shown) respectively, terminal ① of connectors k, k is connected to the positive (+) pole of braking coil $CL_2$, terminal ②, is connected to the negative (−) pole of braking coil $CL_2$, terminal ③ is connected to the positive (+) pole of driving coil $CL_1$, terminal ④ is connected to the negative (−) pole.

Operation of this circuit is as follows; in video camera $M_2$, video control signals 1 is integral amplified by driving amplifier h, changed into suitable driving DC current 2 set in variable resistor g, and drives driving coil $CL_1$ through terminal ③, ④ of connectors k, k.

Reverse voltage generated in braking coil $CL_2$ is fed to video camera $M_2$, through terminal ①② as braking information.

Namely, this DC control type automatic iris lens $L_2$ (paragraph heading "2." above) eliminates galvanometer control circuit p (FIG. 5) against 1.VS control type automatic iris lens $L_1$ so as to be simple in construction.

Therefore, to use this DC control type automatic iris lens $L_2$ (described under heading "2." above), it is necessary to provide galvanometer control circuit p in video camera $M_2$.

However in actuality, it is desired to freely use said two kinds of lenses; of a VS control type automatic iris lens $L_1$ (described under heading "1" above) or a DC control type automatic iris lens L, (described under heading "2." above). And in actuality, connectors k, k used in said two kinds of VS control type automatic iris lens L, or DC control type automatic iris lens L, are the same in construction but connections are different.

Figure 7:
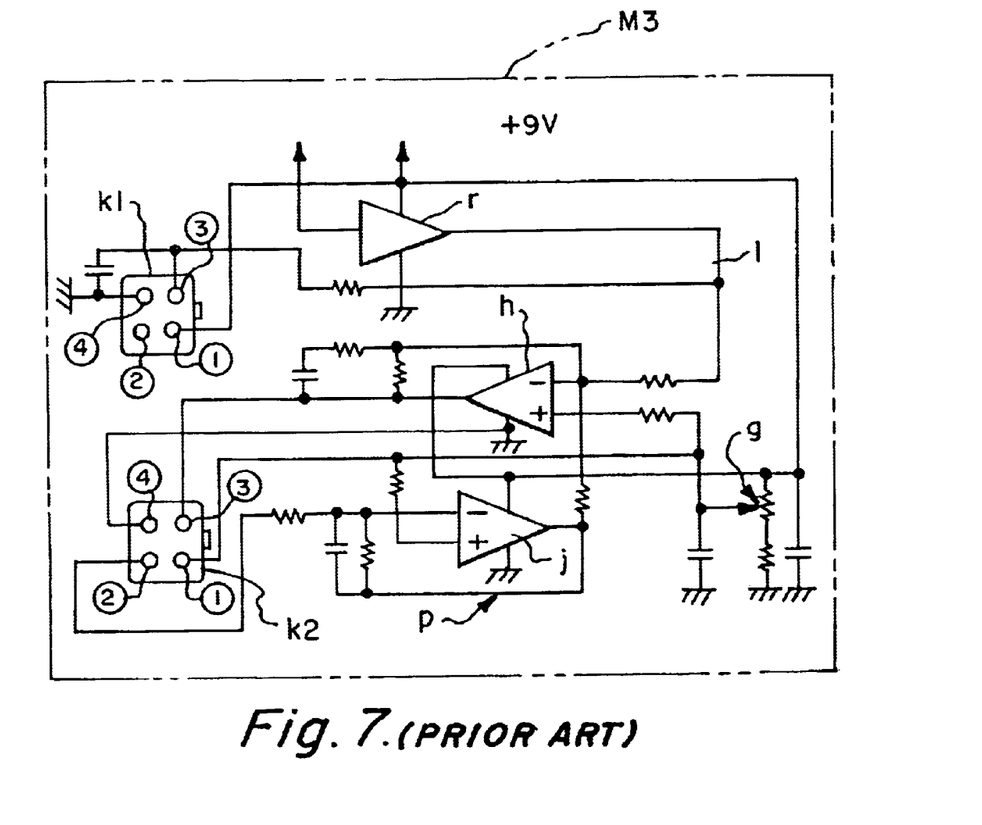
FIG. 7 shows a conventional exchangeable connecting device between video camera $M_3$ and automatic iris lens $L_1$, having galvanometer control circuit p or automatic iris lens $L_2$ not having galvanometer control circuit p.

FIG. 7 shows a circuit of a conventional exchangeable connecting device between video camera $M_3$ and automatic iris lens $L_1$ having galvanometer control circuit p or automatic iris lens $L_2$ but not having galvanometer control circuit p.

Video camera $M_3$ has two connectors $k_1$ and $k_2$ one is for lens $L_1$ and the other is for lens $L_2$.

Terminal ③ of connector $k_1$ for lens $L_1$ outputs video control signal 1 without galvanometer control circuit p. On the other hand, in connector $k_2$, video control signal 1 is integral amplified by galvanometer control circuit p, changed into a suitable driving DC current 2, having its level set by variable resistor g so as to correspond to regular video signal IVpp and terminal ③ of connector $k_2$ for lens $L_2$ and outputs driving DC current 2.

Therefore, the signal for controlling lens $L_1$ and signal for controlling lens $L_2$ are output from connector $k_1$ and connector $k_2$, respectively.

However, it is necessary to change the connector according to the lens being used and this is troublesome and can cause errors.

Figure 8:
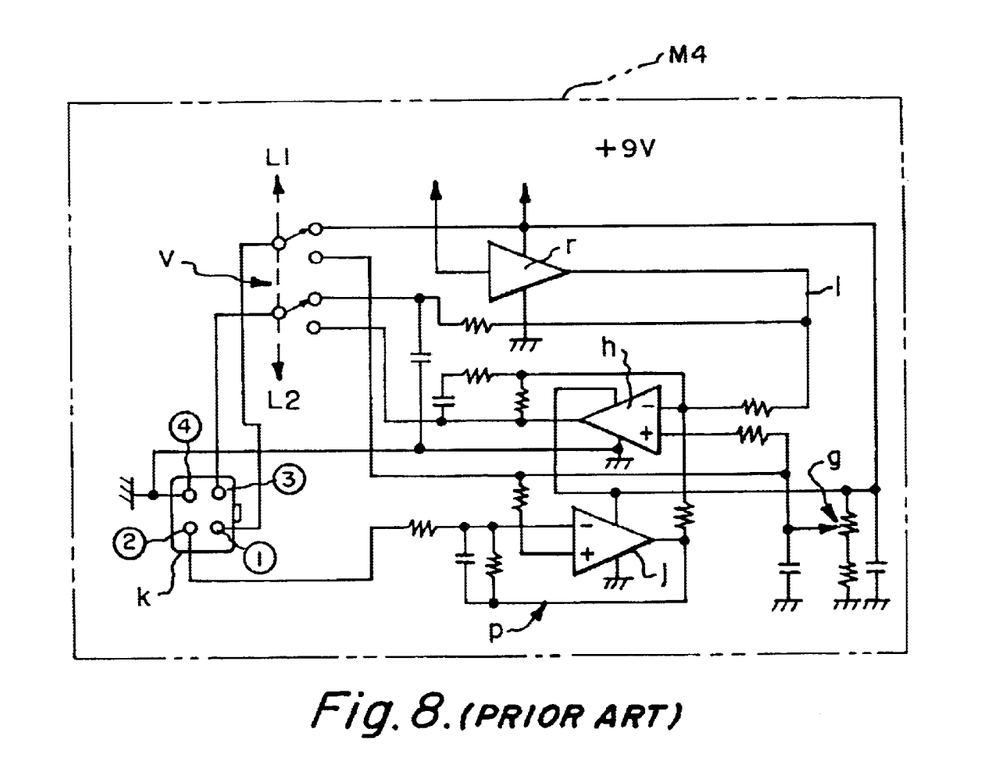
FIG. 8 shows a circuit of a conventional general video camera $M_4$, provided with switch v instead of two connectors for an exchangeable connection of lens $L_1$, having galvanometer control circuit p or lens $L_2$, without galvanometer control circuit p.

FIG. 8 shows a circuit of conventional general video camera $M_4$, provided with switch v instead of two connectors for an exchangeable connection of lens $L_1$ having galvanometer control circuit p or lens $L_2$ without galvanometer control circuit p.

Namely, video control signals 1 and driving DC current 2 of galvanometer f are switched by switch v, and fed to common connector k. Other terminals are also switched.

However, it is necessary to change switch v according to the lens being used and this is troublesome and can cause errors.

Problems to be solved by this invention.

As explained above, in a conventional device, it is necessary to confirm the lens to be used and false connections of the connector or false switching can cause errors and damage of the device.

This invention intends to eliminate said drawbacks, and an object of this invention is to provide and exchangeable connecting device between a video camera and an automatic iris lens in which it is possible to use one common connector k to connect different kind of lenses. It is possible to use either kind of lens $L_1$ or $L_2$ without confirming the kind of lens to be used.

SUMMARY OF THE INVENTION

Claim 1 of this invention is to an exchangeable connecting device between video camera $M_5$ (FIG. 2) such as a CCD (Charged Couple Device) camera, area image sensor and an automatic iris lens. In said video camera $M_5$ one video control signal 1 is amplified the output of light sensor and directly connected to an analogue switch t, the other is connected through galvanometer control circuit p to analogue switch t, said analogue switch t being connected to one common connector k. When video signal control type automatic iris lens $L_1$ is connected to connector k, video control signal 1 amplified the output of light sensor, is directly connected to analogue switch t and common connector k. When a DC control type automatic iris lens $L_2$, said analogue switch t is switched and video control signal 1 is amplified by said galvanometer control circuit p, so that the output of the light sensor is connected to connector k as control current 2 of galvanometer f corresponding to video signal LVpp.

Claim 2 of this invention, a detecting circuit of an exchangeable connecting device between video camera $M_5$ and automatic iris lens as claimed in claim 1, detects a variation of voltage or current at terminals of connector k according to the connection of a video signal control type automatic iris lens $L_1$ or DC control type automatic iris lens $L_2$.

Claim 3 of this invention, is an exchangeable connecting device between video camera $M_5$ and automatic iris lens as claimed in claim 1, in which mechanical switch $v_1$, is used instead of said analogue switch t.

Claim 4 of this invention, an exchangeable connecting device between video camera $M_6$ and an automatic iris lens as claimed in claim 1. In said video camera $M_6$; one of said video control signals 1 is connected through an interfere preventing element to one common connector k and the other is connected to galvanometer control circuit p to said one common connector k. When VS control type automatic iris lens $L_1$ is connected to connector k, video control signals 1 is connected through an interfere preventing element to one common connector k. When DC control type automatic iris lens $L_2$, and video control signals 1 is connected to one common connector k driving DC current 2 of video camera $M_6$ is integral amplified by galvanometer control circuit p.

BRIEF DESCRIPTION OF THE DRAWINGS

FIG. 1(A) shows a block diagram of embodiment 1 of this invention; while

FIG. 2A shows a block diagram of embodiment 2 of this invention; while

FIGS. 3(A) through (D) show embodiment 3 of this invention.

DESCRIPTION OF THE PREFERRED EMBODIMENTS

Figure 1A:
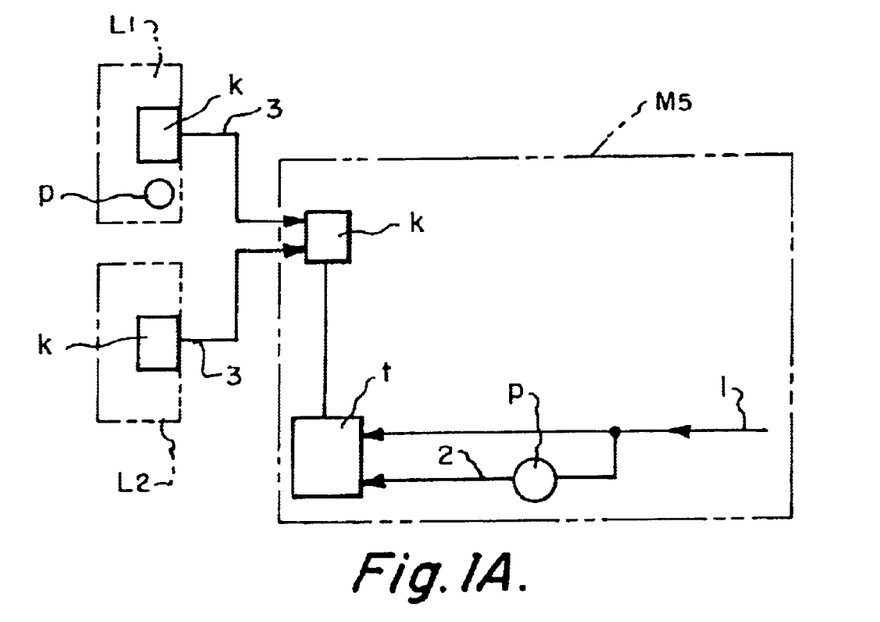
Figure 1B:
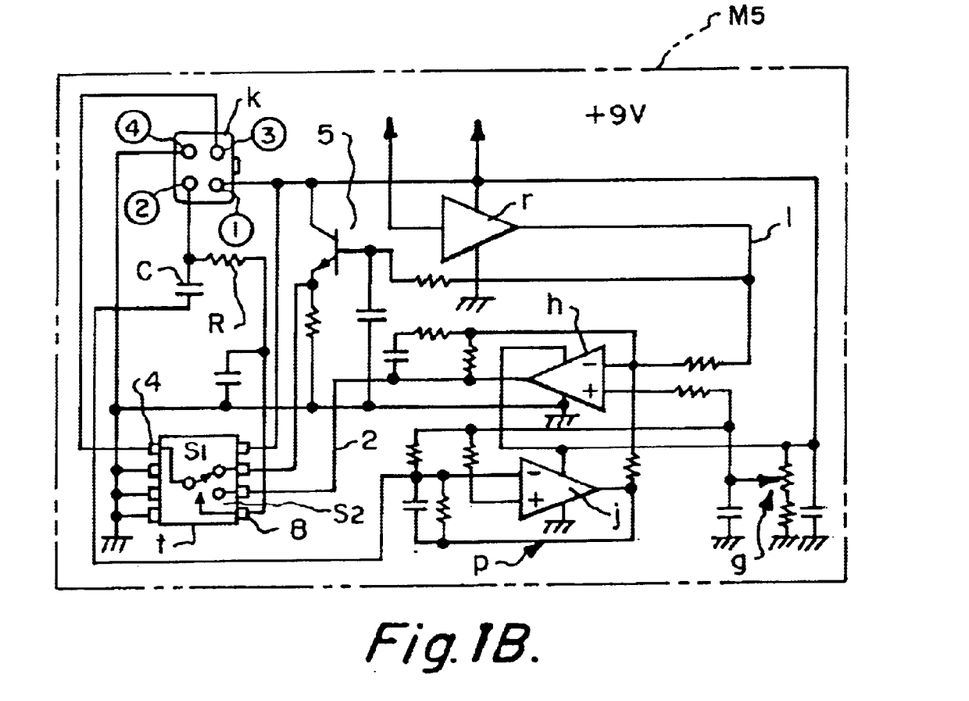
FIG. 1(B) shows a circuit of embodiment 1.

FIG. 1(A) shows a block diagram of embodiment 1 of this invention; FIG. 1(B) shows a circuit of embodiment 1 with the same reference numerals used for the same parts of previous Figures and so on.

This embodiment 1 uses an analogue switch t. As shown in FIG. 1(A), this invention is an exchangeable connecting device between video camera $M_5$ such as a CCD (Charged Couple Device) camera, area image sensor and automatic iris lens. In said video camera $M_5$ one of video control signals 1 is an amplified output of the light sensor and is directly connected to analogue switch t, while the other is connected through galvanometer control circuit p to analogue switch t, with said analogue switch t being connected to one common connector k. When video signal control type automatic iris lens $L_1$ is connected to connector k, video control signal 1, amplified the output of the light sensor is directly connected to analogue switch t. When as a DC control type automatic iris lens $L_2$, said analogue switch t is switched and video control signal 1 is amplified by said galvanometer control circuit p, the output of the light sensor is connected to connector k as control current 2 of galvanometer f corresponding to video signal IVpp.

As shown FIG. 1(B), said analogue switch t is an electronic switch having switch terminals $S_1$, $S_2$ and normally terminal of switch $S_1$ connects to common terminal 4. At the active state by adding a voltage to control terminal 8, terminal of switch $S_2$ connects to common terminal 4 and switch $S_1$ opens.

Control terminal 8 is connected to terminal ② of connector k through resistor R. In video camera $M_5$ side, terminal ① of connector k is connected to a positive (+) electric source (normally DC 9V), terminal ① of connector k of video signal control type automatic iris lens $L_1$ side is connected to the driving part of galvanometer control circuit p (see FIG. 5), and terminal ① of connector k of a DC control type automatic iris lens $L_2$ a side is connected to braking coil $CL_2$ (see FIG. 6).

Terminal ③ of connector k of video camera $M_5$ side is connected to common terminal 4. Terminal ③ of connector k of VS control type automatic iris lens $L_1$ side is connected to driving coil $CL_1$, through amplifier h of galvanometer control circuit p (see FIG. 5), and terminal ③ of connector k of a DC control type automatic iris lens $L_2$ side is connected to driving coil $CL_1$ (see FIG. 6).

Terminals ④, ④, ④ of connectors k, k, k on every side are connected to GND.

In this video camera $M_5$, a video signal from a light sensor is amplified by constant amplifier r (normally 6 dB to 12 dB) to be a video control signal 1. Video control signal 1 is connected to a terminal of switch $S_1$ of analogue switch t through buffer transistor 5. While this video control signal 1 is integral amplified by driving amplifier h of galvanometer control circuit p and connected to terminal ③ of connector k through switch $S_2$ as a driving DC current 2 corresponding to regular video signal 1Vpp. The level of driving DC current 2 is adjusted by variable resistor g.

When connector k of VS control type automatic iris lens $L_1$ is connected to connector k, video control signals 1 is directly fed through a terminal of switch $S_1$, of analogue switch t, common terminal 4, terminal ③ of connector k to automatic iris lens $L_1$.

When a DC control type automatic iris lens $L_2$ is connected to connector k, video control signals 1 is fed through galvanometer control circuit p, terminal of switch $S_2$, common terminal 4, terminal ③ of connector k to automatic iris lens $L_2$ as driving DC current 2.

Namely, automatic iris lens $L_1$ is connected to video camera $M_5$, analogue switch t is in the state of switch $S_1$ being connected to common terminal 4 because terminal ② is NC (no connection) (see FIG. 5).

Automatic iris lens $L_2$ is connected to video camera $M_5$, voltage is added to terminal ② through braking coil $CL_2$, and analogue switch t is in the state of switch $S_2$ being connected to common terminal 4.

As explained above, in video camera $M_5$, a change of voltage or current detected according to the connection of VS control type automatic iris lens $L_1$ or a DC control type automatic iris lens $L_2$, analogue switch t is switched. And analogue switch t acts as a detecting circuit in exchangeable connecting device between a video camera and an automatic iris lens.

Operation of above device is as follows;

When connector k of video camera $M_5$ is connected to connector k of VS control type automatic iris lens $L_1$, video control signals 1 output from constant amplifier r is connected to terminal ③ of connector k through buffer transistor 5, and switch $S_1$ of analogue switch t, and automatic iris lens $L_1$. operates.

When connector k of video camera $M_5$ is connected to connector k of a DC control type automatic iris lens $L_2$, said video control signals 1 regulated by driving amplifier h of galvanometer control circuit p to be driving DC current 2, driving DC current 2 passes switch $S_2$ of analogue switch t, flows to driving coil CL, and operates automatic iris lens $L_2$.

While, reverse voltage generated in braking coil $CL_2$ is output to terminal ② in addition to electric source voltage, added to amplifier j and this amplified braking signal feedback to driving amplifier h, make the movement of galvanometer f smooth and stable operation is obtained.

As explained above, any of connector k of VS control type automatic iris lens $L_1$, or a DC control type automatic iris lens $L_2$, is connected, normally operates.

Figure 2A:
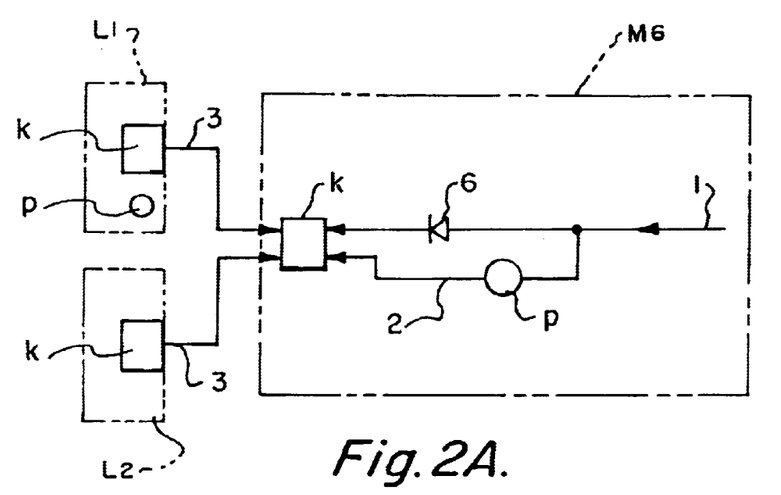
Figure 2B:
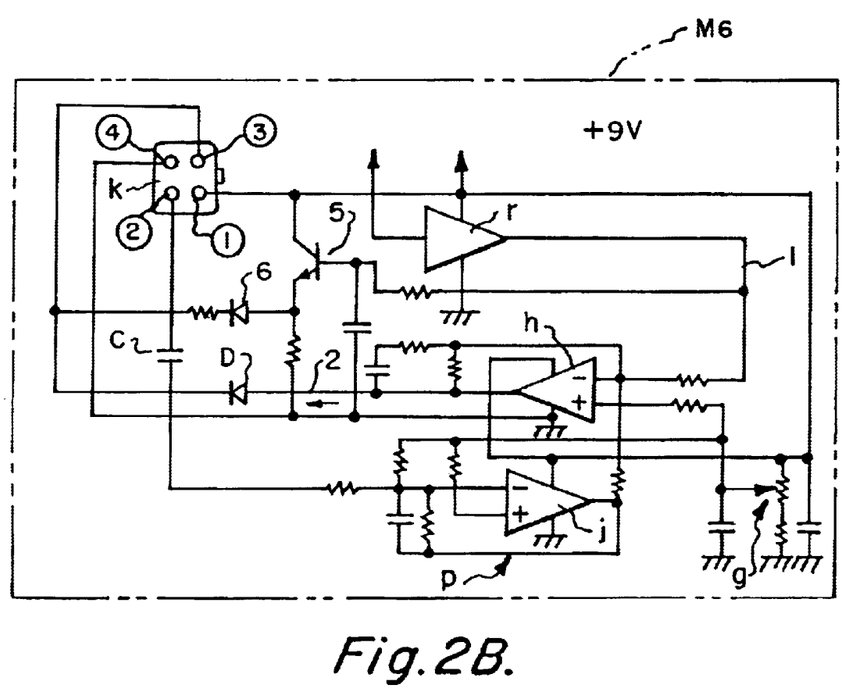
FIG. 2(B) shows a circuit of embodiment 2.

FIG. 2(A) shows a block diagram of embodiment 2 of this invention. FIG. 2(B) shows a circuit of embodiment 2 with same reference numerals used for the same parts of the previous Figures and so on. In this embodiment 2, analogue switch t of video camera $M_5$ in embodiment 1 is eliminated and an interfere preventing element such as diode 6 is employed and two kinds of signals correspond to connected lens $L_1$ or $L_2$ are used.

As shown in FIG. 2(A), an exchangeable connecting device is between video camera $M_5$ such as a CCD (Charged Couple Device) camera, area image sensor and automatic iris lens. In said video camera $M_6$ one of said video control signals 1 is connected through interfere preventing element 6 to one common connector k and the other is connected to galvanometer control circuit p to said one common connector k. When video signal control type automatic iris lens $L_1$ is connected to connector k, video control signals 1 is connected through interfere preventing element 6 to one common connector k. When a DC control type automatic iris lens $L_2$ is connected, video control signals 1 is connected to one common connector k as driving DC current 2 of video camera $M_6$ integral amplified by galvanometer control circuit p.

As shown in FIG. 2(B), in said video camera $M_6$ such as a CCD (Charged Couple Device) camera, area image sensor, video control signal 1 is connected to terminal ③ of connector k through interfere preventing element 6. While, said video control signals 1 is connected through galvanometer control circuit p driving DC current 2 of galvanometer f of regular level is connected to terminal ③ of common connector k through diode D. Therefore, in terminal ③ video control signal 1 is superimposed on driving DC current 2. This video control signal 1 is a part of video signal 1Vpp and deemed as an alternative signal.

In said video camera $M_6$, terminal ① of connector k is connected to a positive (+) electric source (normally DC 9 V) and the driving part of galvanometer control circuit p. Terminal ① of connector k of VS control type automatic iris lens $L_1$ is connected to a driving part of galvanometer control circuit p (see FIG. 5). Terminal ① of connector k of automatic iris lens $L_2$ side is connected to braking coil $CL_2$ (see FIG. 6).

Terminal ② of connector k of video camera $M_6$ side is connected to amplifier j of galvanometer control circuit p. As explained, terminal ② of connector k of VS control type automatic iris lens $L_1$ side is NC (no connection) (see FIG. 5). Terminal ② of connector k of automatic iris lens $L_2$ side is connected to braking coil $CL_2$ (see FIG. 6).

As explained, terminal ② of connector k of video camera $M_6$ side is connected to buffer transistor 5 through interfere preventing element 6, connected to amplifier h of galvanometer control circuit p. As explained, terminal ③ of connector k of VS control type automatic iris lens $L_1$ side is connected to driving coil $CL_1$ through amplifier h of galvanometer control circuit p (see FIG. 5). Terminal ③ of connector k of a DC control type automatic iris lens $L_2$ side is connected to driving coil $CL_1$ (see FIG. 6).

Terminals ④, ④, ④ connectors k, k, k on every side are connected to GND.

Operation of above device is as follows;

When connector k of video camera $M_5$ is connected to connector k of VS control type automatic iris lens $L_1$, as the input impedance is high enough, a DC component is prevented by a condenser, driving DC current 2 is ignored and, video control signals 1 is connected to terminal ③ through buffer transistor 5 and interfere preventing element 6, automatic iris lens $L_1$ works only by a component of video control signals 1 (see FIG. 5).

When connector k of video camera $M_5$ is connected to connector k of DC control type automatic iris lens $L_2$, driving coil $CL_1$ is connected to terminals ③, ④ video control signals 1 is ignored and driving DC current 2 flows to driving coil $CL_1$ and controls iris I (see FIG. 6).

In FIG. 2(B), a diode is shown as interfere preventing element 6, a suitable resistor, transistor, condenser, etc. may be used to prevent damage to other elements by a reverse current and interference of signals.

FIG. 3 shows embodiment 3 of this invention, in which mechanical switch $v_1$ a is employed instead of analogue switch t or switch v in FIG. 8.

Figures 3A, 3B, 3C:
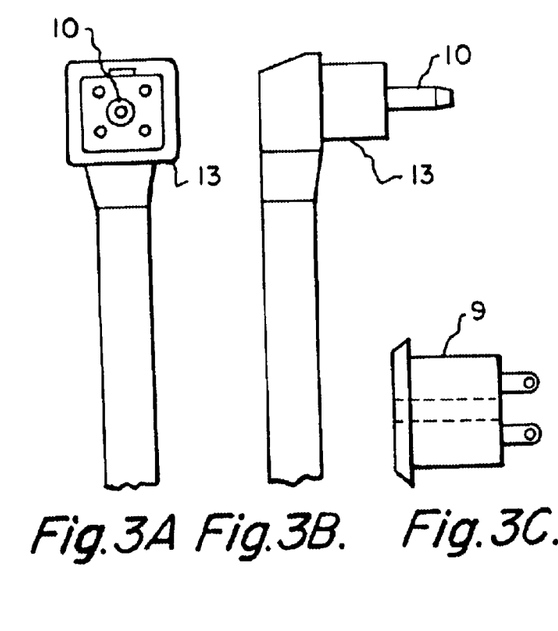
FIG. 3(A) is a front view of connector k plug on the lens side.
FIG. 3(B) is a side view of the plug.
FIG. 3(C) is a side view of connector k socket on the camera side.
Figure 3D:
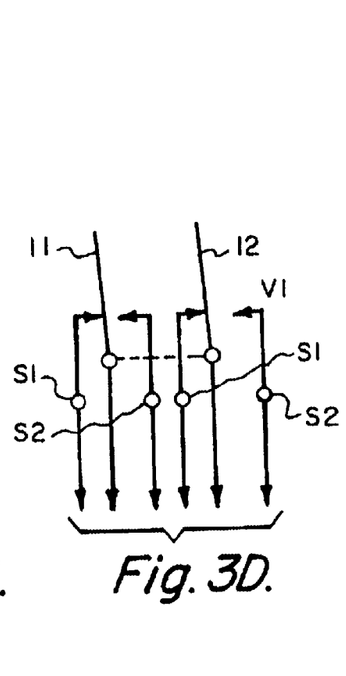
FIG. 3(D) is a circuit diagram of the socket.
Figure 3E:
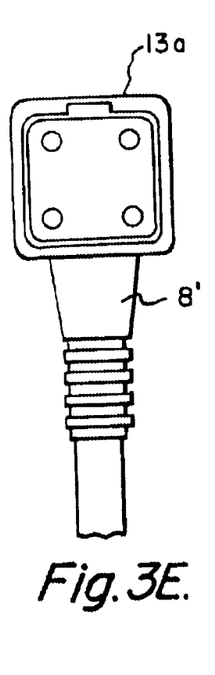
FIG. 3(E) is a front view of connector k plug.
Figure 3F:
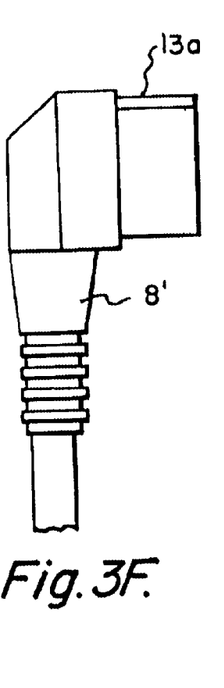
FIG. 3(F) is a side view of the plug.

In this switch $v_1$, construction of a plug in a connector on the lens side and a socket in a connector of the camera side are changed. FIG. 3 shows embodiment 3 of this invention. FIG. 3(A) is a front view of a connector k plug on the lens side. FIG. 3(B) is a side view of the plug. FIG. 3(C) is a side view of socket 9 of connector k on the camera side. And FIG. 3(D) is a circuit diagram of the socket.

As shown in FIG. 3, alternative plugs 13, 13 in connector k of automatic iris lens $L_1$, $L_2$, on the lens sides act as and form switch $v_1$. One plug 13 has projection 10 as shown in FIGS. 3(A) and (B) while an alternative plug 13 would not have center projection 10 as shown in FIGS. 3(E) and 3(F). Socket 9 of connector k on the camera side provides elastic pieces 11, 12 as shown in FIG. 3(C), which engage projection 10.

Operation of above device is as follows;

According to whether lens L, or L, is used, plug 13 may or may not have projection 10, and engagement with elastic piece 11, 12 occurs or does not occur, and circuit of switch v, changes. Therefore, using iris lens $L_1$, $L_2$ lens is distinguished and acts as switch v in FIG. 8 and a user can use either of iris lens $L_1$ or lens $L_2$ without paying attention.

In prior art explained in FIG. 8, it is possible to accomplish the effect of this invention by replacing the switch v with this effect of switch v, formed by plugs 13 and socket 9.

In prior art explained in FIG. 8, it is possible to accomplish the, Effect of this invention.

According to this invention, it is possible to use different kinds of iris lens $L_1$ or lens $L_2$ connected to its connector without paying particular attention to the kind of lens being used.

What we claim is:

1. An exchangeable connecting device between a video camera ($M_5$), such as a CCD (Charged Couple Device) camera, an area image sensor and an automatic iris lens; in said video camera ($M_5$) one video control signal (1) as an amplified output of a light sensor is directly connected to an analogue switch (t), while the other is connected through a galvanometer control circuit (p) to an analogue switch (t), said analogue switch (t) being connected to one common connector (k); when a video signal control type automatic iris lens ($L_1$) is connected to said one common connector (k), said video control signal (1) amplified output of a light sensor is directly connected to said analogue switch (t) and said one common connector (k); when a DC control type automatic iris lens $L_2$ is connected, said analogue switch (t) is switched and said video control signal (1) is amplified by said galvanometer control circuit (p) so that the output of said light sensor is connected to said common connector (k) as a control current (2) of said galvanometer (f) corresponding to a video signal (IVpp).

2. An exchangeable connecting device between said video camera ($M_5$) and an automatic iris lens as claimed in claim 1, in which a mechanical switch $v_1$, is used instead of said analogue switch (t).

3. An exchangeable connecting device between a video camera ($M_6$) and an automatic iris lens as claimed in claim 1; in said video camera ($M_6$) one of said video control signals (1) being connected through an interference preventing element to said one common connector (k) and the other being connected to said galvanometer control circuit p to said one common connector (k); when a video signal control type automatic iris lens $L_1$, is connected to said one common connector (k), said video control signal (1) is connected through an interfere preventing element to said one common connector (k); and when a DC control type automatic iris lens ($L_2$) is connected, said video control signal (1) is connected to said one common connector (k) as a driving DC current (2) of video camera ($M_6$) integrally amplified by said galvanometer control circuit p.

4. An exchangeable connecting device according to claim 1 including a detecting circuit having a detector for detecting a variation of voltage or current of a connector (k) according to the connection of a (VS) video signal control type automatic iris lens ($L_1$) or a DC control type automatic iris lens ($L_2$).

5. An exchangeable connecting device between a video camera, such as a CCD (Charged Couple Device) camera, an image area sensor and an automatic iris lens comprising; an analogue switch; said video control signal of said video camera connected directly to an analogue switch; a galvanometer control circuit connecting said video control signal of said video camera to said analogue switch; said analogue switch being connected to a common connector for said automatic iris lens; said analogue switch automatically switching between a direct connection when a video signal control type automatic iris lens is connected to said video camera and through said galvanometer control circuit when a DC control type automatic iris lens is connected to said video camera; whereby either type of automatic iris lens can be connected without the necessity of determining the type of lens.

6. The device according to claim 5 including; a detector detecting a variation in a signal at the terminals of said common connector; said variation in signal automatically activating said analogue switch according to the type of automatic iris lens connected to said camera.

7. The device according to claim 5 in which said analogue switch is a mechanical switch; said mechanical switch being activated by a mechanical connection of said automatic iris lens.

8. An exchangeable connecting device between a video camera, such as a CCD (Charged Couple Device) camera, an image area sensor and an automatic iris lens comprising; an interference preventing element connecting said video control signal of said video camera to a common connector, a galvanometer control circuit connecting said video control signal of said video camera to said common connector; said common connector selectively connecting said interference preventing element when a (VS) video signal control type automatic iris lens to said video camera and selectively connecting said galvanometer control circuit when a DC control type automatic iris lens is connected to said video camera; whereby either type of automatic iris lens can be connected without the necessity of determining the type of lens.

* * * * *